Feb. 28, 1961   W. T. MILANOVITS ET AL   2,972,915
DRILLING MACHINE
Filed June 29, 1959   2 Sheets-Sheet 1

William T. Milanovits,
Thomas Milanovits,
Inventors.
Koenig and Pope,
Attorneys.

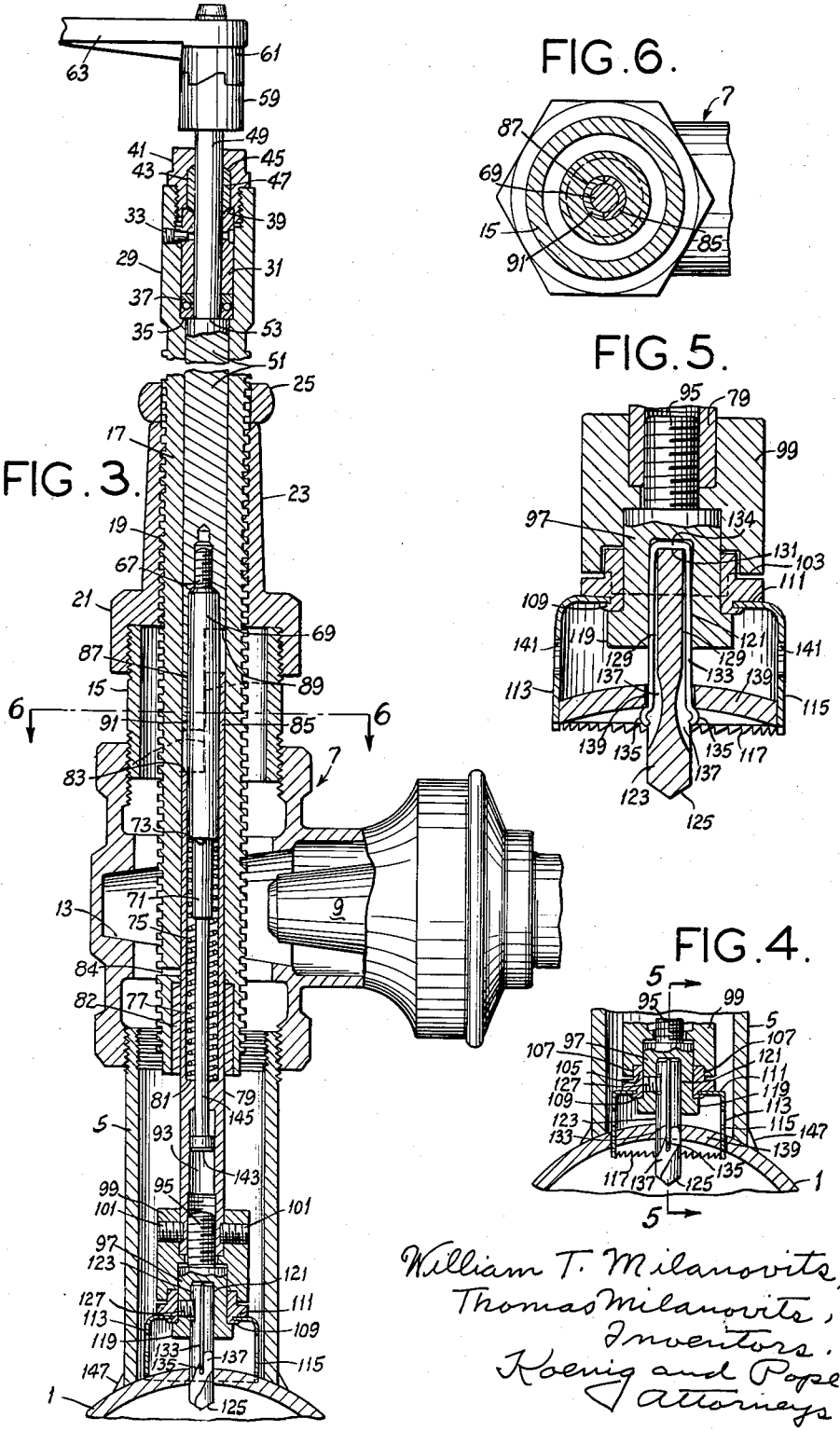

United States Patent Office 2,972,915
Patented Feb. 28, 1961

2,972,915
DRILLING MACHINE

William T. Milanovits, Crestwood, and Thomas Milanovits, Richmond Heights, Mo., assignors to M. L. Mfg. Co., Manchester, Mo., a corporation of Missouri Filed June 29, 1959, Ser. No. 823,574

14 Claims. (Cl. 77—42)

This invention relates in general to drilling machines, and with regard to certain more specific features to such machines for drilling comparatively large holes in pipes, tanks and the like under internal pressure.

Among the several objects of the invention may be noted the provision of a leakproof drilling machine adapted to drill such holes in pipes, tanks and the like carrying fluid under pressure; the provision of a drilling machine of the class described adapted positively to retrieve the slugs of metal which occur when drilling such holes; the provision of a drilling machine of this class which effects optimum cutting-feed conditions for the cutting tools employed, thus extending their cutting lives; and the provision of a drilling machine of this class which is convenient and foolproof in operation. Other objects and features will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which one of various possible embodiments of the invention is illustrated, Fig. 1 is a side elevation of the machine shown in a preliminary position of application, certain pipe and fittings being shown in cross section;

Fig. 3 is a view similar to Fig. 2 showing conditions during drilling;

Fig. 4 is a view of parts shown at the lower end of Fig. 3 in a condition wherein drilling has been completed;

Fig. 5 is an axial detail section taken on line 5—5 of Fig. 4 but on an enlarged scale; and Fig. 6 is an enlarged cross section taken on line 6—6 of Fig. 3.

Corresponding reference characters indicate corresponding parts throughout the several views of the drawings.

Figure 1:
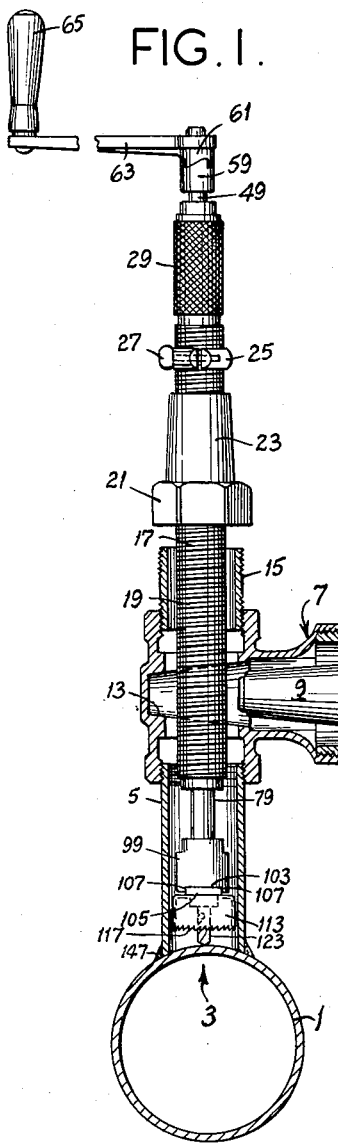

Referring now more particularly to Fig. 1, there is shown at numeral 1 a work member, as for example a gas main, which is to have a comparatively large-sized hole cut at location 3. In order to accomplish this, there is as usual first welded to the main 1 a leader 5 to which is threaded a conventional gate valve 7 having a gate 9 operated from a control wheel 11. The seat for the gate 9 is shown at 13. Attached to the inlet of the gate valve is a threaded nipple section 15. Since any one of a number of gate valves such as 7 may be used, it is shown schematically only.

The new drilling machine comprises a sleeve 17 which is provided with an external coarse male thread 19, such as the Acme type. This engages accurately with a conjugate female thread of a holder nut 21 having an elongation 23. The lower portion of the nut 21 is hexagonal as shown, for wrench-engaging purposes. Elongation 23 is for the purpose of obtaining an extensive thread engagement for resisting fluid leakage along the threads.

Slidably supported on the outside of the thread 19 above the nut 21 is a split nonthreaded resilient ring or collar 25 having a sidewise clamp screw 27, adapted to move along the outsides of the threads 19. Since the inside of the collar is not threaded for interengagement with the threads 19 the collar 25, when loosened, may be slipped along the threads 19 and held in any clamped axial position by tightening the clamp screw 27. The outer end of the sleeve 17 is provided with a knurled portion 29, whereby the sleeve 17 may be gripped and turned for threading through the nut 23.

Pressed within the knurled portion 29 is a bushing 31 with which is associated lubricating means 33. Between the inner end of the bushing 31 and a shoulder 35 of the sleeve 17 is an end-thrust bearing 37. The other end of the bushing 31 is chamfered as shown at 39. Threaded into the outer end of the sleeve portion 29 is a packing gland 41 having a recess 43 therein which is chamfered as shown at 45. Packing material 47 is located between the chamfers 39 and 45.

Extending through the bushing 31 and packing gland 41 is an outer extension 49 of an inner rotary drive member 51. Parts 49 and 51 are joined at a shoulder 53 which abuts the thrust bearing 37. Attached to the outer end of the extension 49, by means of a key 55 and a set screw 57, is a ratchet-toothed coupling 59. At 61 is shown the hub of a crank 63 having a handle 65. The hub 61 is bored out for slipping over the outer end of the extension 49. This hub 61 also includes a conjugate ratchet-toothed portion adapted to interfit with the ratchet-toothed portion 59. By this means the shaft portion 51 may be ratchet-driven from the crank 63 in a clockwise direction, viewed from the top of Fig. 1. The ratchet teeth release upon anti-clockwise rotation of the crank. The crank 63 is removable.

The lower end of the driver 51 is made hollow for the threaded reception as at 67 of a guide pin 69, the lower end of which pin 69 is reduced as shown at 71 to provide a shoulder 73. The upper end of a compression spring 75 surrounds the reduced portion 71 and bears against the shoulder 73. This spring extends downward through the hollow portion 77 of a quill 79. The quill 79 has an internal shoulder 81 for abutment of the spring 75 at its lower end. A bearing 82 is provided in the lower end of the tube 17 around the quill 79. A port 84 is located above the bearing 82. This is to equalize pressure across the bearing 82 in order to prevent quill 79 from being pushed out under pressure conditions in the leader 5.

The upper end of the hollow quill 79 is notched out around the guide pin 69, as shown at 83. This leaves a half-shell portion 85 of the quill 79 partially surrounding pin 69. The lower end of the drive shaft 51 is also made hollow as shown at 87, where it is notched out around guide pin 69 as shown at 89, thus leaving a half-shell extension 91 for driving engagement with the half-shell portion 85. By this construction the drive shaft 51 upon rotation drives the quill 79 in any axially telescoped positions of the telescoping half-shell portions 85 and 91.

The quill 79 is counterbored below the shoulder 81 as shown at 93 wherein it is threaded for the reception of a fastening screw portion 95 extending from a drill-supporting bushing 97.

Attached to the outside of the lower end of the quill 79 is a socket 99, being held in position by set screws 101. The lower end of the socket 99 is cross milled as shown at 103 for the interlocking reception of a second bushing 105 having flat sides 107. The bushing 105 forms an extension of a bushing 109 which is spun into a hole in the flat end wall 111 of a cup-shaped hole saw 113. The hole saw 113 has cylindrical side walls 115 on which are marginally cut teeth 117. The drill-holding bushing 97 is adapted to slip through the saw-holding bushing 109 and is provided with a hexagonal head 119 whereby, upon tightening threads 95 by a socket wrench, both bushings will be attached to the socket 99. The mill 103 and flat portions 107 effect a positive driving connection between socket 99 and the saw bushing 109.

The bushing 97 includes a socket 121 for a drill 123, the cutting end 125 of which extends beyond the teeth 117 of the saw 113. This drill 123 is held in the socket 121 by a set screw 127. As shown in Fig. 5, the drill 123 is axially gashed on its sides as indicated at 129, and transversely gashed on its back end as indicated at 131, for the reception of a U-shaped spring clip 133. The free ends of the cantilever spring legs of the clip 133 are formed as detents 135. Their other ends are anchored by the cross connection between them at the back end of the drill as shown at 134. The gashes 129 terminate in the upper ends of the usual helical drill flutes 137, so that the detents 135 may be depressed inward below the cylindrical formative surface of the drill.

The purpose of the sprung detents 135 is to hold captive any sawed-out slug, shown at 139, and to permit its convenient removal from the saw 113 and drill 123 when desired. For the purpose, openings 141 are in opposite sides 115 of saw 113, through which an appropriate tool such as a screwdriver may be inserted and used as a lever to force the slug 139 out from the confines of the saw 113 and from the end of the drill 123. During this procedure the detents 135 spring together and pass through the central opening 138 formed in the slug 139 by the drill 123. The drill 123 and the spring clip 133 may be referred to as a retrieving drill head. It is novel per se, among its advantages being the ease with which a conventional fluted drill may be converted by simple gashing to receive the easily made and applied spring clip 133. Moreover, one clip may serve several drills as they wear out, being easily removable and attachable by axial sliding movements. The clip is held in place after assembly by reason of its location with the drill in the socket therefor in the bushing 97.

Returning to the description of the quill 79, it will be seen that its hollow portion 93 contains a head 143 of a stem 145, the upper end of which is threaded into the reduced part 71 of the pin 69. This head 143 has a lost-motion movement in the hollow counterbore 93, movement being relative.

Figure 2:
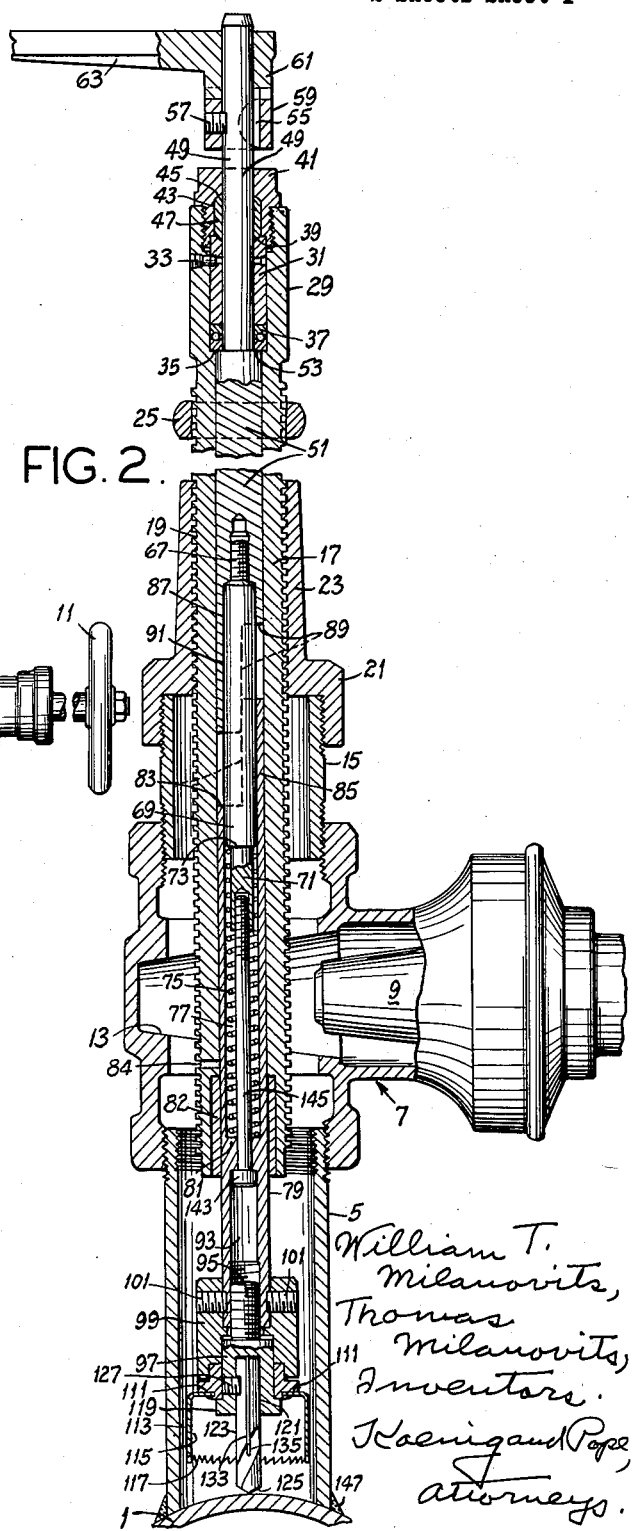
Fig. 2 is a cross section of the drilling machine shown in a subsequent stage of application to said fittings preliminary to drilling the pipe.

Operation is as follows:

Assume that the main 1 under, say, gas pressure, is to have a branch connected to it. Before the drilling machine is brought into action, the leader 5 is welded to pipe 1, as shown at 147. The gate valve is then threaded to leader 5. The nipple 15 is then threaded to the gate valve 7. With the gate valve 7 open, as shown in Fig. 1, the drilling machine may be inserted. First, however, the sliding clamp ring 25 is moved upward and the nut 21 backed off sufficiently that the threaded sleeve 17 may be inserted through members 5, 7 and 15 (Fig. 1). Then, as shown in Fig. 2, the nut 21 may be threaded to the nipple 15. This may or may not bring the drill 123 into contact with the pipe 1, but if not, the sleeve 17 may be turned from the knurled portion 29 until it does so (Fig. 2). Before the time of first contact of the drill 123 with the pipe 1, the spring 75 is in expanded condition, so that the notches 83 and 89 have maximum though not complete separation (Fig. 2) in view of engagement between head 143 with the upper end of the counterbore 93. By screwing in the sleeve 17, most or all of this separation may be taken up. When it is all taken up, a signal is provided for the operator by reason of the sudden increase in resistance at the knurled portion 29 to turning the sleeve 17. This is due to abutment between notched portions 85 and 91. Head 143 is then near the bottom of the counterbore 93 and quill 79 is as high as it will go, all clearance at notches 83 and 89 having been taken up. Then the clamp ring 25 is slipped down and clamped into position directly above the nut 21, as shown in Fig. 3. The crank 63 is then applied to form the ratchet coupling between parts 59 and 61. Upon rotating the handle 65, the elements 49 and 51 are driven. This drives the notched-out half-shell portion 91, which in turn drives the half-shell portion 85 of the quill 79, the interengaging half-shells 85 and 91 forming the telescoping coupling between members 51 and 79. As rotation proceeds, the drill 123, under resilient pressure from compressed spring 75 on quill 79, will drill a pilot hole in the pipe 1, followed by cutting action of the saw 113. The collar 25 as this time prevents the sleeve 17 from threading into nut 21 due to any friction between the sleeve and the parts turning therein. As drilling proceeds, the clearance between notches 83 and 89 increases (Fig. 3).

Fig. 3 shows conditions after the drill 123 has completed its pilot hole and the saw 113 has started its cut. Fig. 4 shows the conditions after the saw 113 has completed its cut, to produce the separated slug 139, which at this time is in a position on the drill 123 above the detents 135. Thus the slug, instead of being lost in the pipe 1, as formerly usually occurred when hole saws or the like were used, is held captive. A signal that the hole has been completely cut and the slug is in retrievable position is given to the operator when the turning resistance on crank 63 becomes nil. The operator then applies reverse torque at the knurled portion 29 of the sleeve 17. This backs the sleeve out through the nut 23 until the point 125 of the drill is above the gate 9, whereupon the valve 7 may be shut off. A sufficient amount of backing off is signalled when the margin of the socket 99 strikes the inside bottom of the nut 21.

After the gate valve has been closed, the nut 21 is removed from the nipple 15 and the device removed. Thereafter a branch line may be connected to the nipple 15 and the valve 7 reopened for service. If desired, the nipple 15 may be removed and the branch line connected to valve 7.

The purpose of the head 143 of the stem 145 in the hollow portion 93 of the quill 79 is to limit the outward movement of the half-shell 85, as shown in Fig. 2, so that the driving connection between the half-shells 85 and 91 will not be lost in any condition of the drill when removed from its cutting position.

Advantages of the invention over old means for the purpose are as follows:

(1) The feeding pressure for the drill 123 and saw 113 is entirely resilient, in view of the compressed condition of the spring 75 during the drilling process. Thus the drill and the saw will advance under best cutting conditions, seeking their own best rate of feed. These improved conditions are unlike those which existed in prior drilling apparatus of this class in which the cutting tools were positively advanced while cutting, in accordance with the pitch requirements of a positively driving feed screw. The tendency of the former structures was to advance the cutting instruments, such as the drill and saw, at arbitrary rates for which they are not designed. This led to drill and saw breakage and/or shortened effective cutting lives. By means of the present invention, the cutting instruments under pressure of the spring 75 seek their own proper rates of advance according to the manner in which they are sharpened, the character of the metal being drilled, and other cutting conditions.

(2) All slugs removed in making the desired hole are positively retrieved. Heretofore with drilling apparatus of this class, slugs such as 139 often dropped into the pipe and were often lost, for it was then difficult, if not impossible, to retrieve them. Often they were swept along the pipe by the flow of the contents therein to become lodged at undesirable points in the pipe 1.

(3) The new cutting machine is comparatively simple in construction, and simple and foolproof as regards operation. As above described, the steps required for application of the device to the nipple 15 are simple, and tactile signals are produced for determining various steps in operation.

(4) The means for preventing leakage of the pressurized contents of the pipe 1 during drilling are simple, being the parts associated with the packing means at 45 and the long thread in the extension 23 of the nut 21. Such a long thread, when properly lubricated, has been found to be an effective deterrent against outward leakage between the sleeve 17 and the nut.

(5) Retrieved slugs such as 139 are easily removed from the saw and drill after a drilling operation.

(6) Worn-out cutting elements (drill 123 and hole saw 113) may easily be replaced by unthreading bushing 97 at 95. Thereupon, bushing 97 may be slipped out from the bushing 109. Then a new drill and/or a new bushing 109 with a new saw 113 may be inserted. If desired, the new saw may be of different diameter. The drill 123 may be changed in bushing 97 by release at the set screw 127.

It will be appreciated that the cutting head described herein is in and of itself a new subcombination of parts which may be useful not only on the present machine but on other machines. It is unique in the fact that its pilot drill 123 includes the detent means 133, 135 for holding captive a slug such as 139 removed by the saw 113.

Hereinafter the term cutting head means the assembly on the lower end of the quill 79 comprising both the drill and saw cutting means.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A drilling machine comprising a cutting head, a sleeve, an external holder in which said sleeve is axially adjustable, means for attaching the holder to a connector on a work member to be drilled, coaxially arranged driving and driven elements in said sleeve, said driven element supporting said cutting head, a telescopic rotary driving connection between said driving and driven elements, resilient means between said driving and driven elements biasing the driven element and the supported cutting head from the sleeve through said connector to force said head into contact with the work member, and means for applying torque to said driving element.

2. A drilling machine comprising a cutting head, an externally threaded sleeve, an external nut threaded on said sleeve and having threads for attachment to a connector on a work member to be drilled, coaxially arranged rotary driving and driven elements in said sleeve, thrust means fixing the axial position of the rotary driving element in the sleeve, said driven element supporting said cutting head, a telescoping driving connection between said driving and driven elements, resilient means between said driving and driven elements movably biasing the driven element and the supported cutting head from the sleeve through said connector and into cutting contact with the work member, stop means limiting the biasing movement to an amount which will maintain the telescopic driving connection between the driving and driven elements, and means for applying torque to said driving element.

3. A drilling machine according to claim 2, including a slidable clamp means on the outside of the sleeve.

4. A drilling machine according to claim 2, wherein the threaded connection between said sleeve and said nut is sufficiently long to inhibit leakage therethrough and including a packing gland between said sleeve and the rotary driving element therein.

5. A drilling machine according to claim 2, wherein said cutting head comprises a pilot drill, and including a hole saw surrounding said drill and catch means on the drill adapted to hold captive a slug removed by the drill in boring a hole in the work member.

6. A drilling machine according to claim 2, including a nonthreaded clamping ring slidable exteriorly on the outside of said sleeve and adapted to be clamped thereto adjacent the nut in any relative position of the nut on the sleeve, and including means for applying torque to the driving member and the sleeve.

7. A drilling machine comprising a hollow externally threaded sleeve, an external nut threaded on said sleeve adapted for attachment to a connector on a member to be drilled, a packing gland and a thrust means at one end of the sleeve, a rotary drive shaft in the sleeve having a thrust element engageable with said thrust means and an outside extension through said packing gland, a crank on said extension, a rotary driven quill extending from the other end of the sleeve and having a counterbored extension therefrom providing a first shoulder, a cutting head carried on said extension, telescopic drive means between said drive shaft and said driven quill, means extending from the drive shaft through the quill providing a second shoulder spaced from the first shoulder and also providing a head in said counterbore of the quill engageable with the first shoulder adapted to limit telescoping of the drive means, and a compression spring between said shoulders biasing apart the drive shaft and the quill.

8. A drilling machine comprising a hollow sleeve, an external member through which said sleeve is movable, said external member being formed to effect a sealed connection with a connector on a member to be drilled and to form a movable sealed connection with said sleeve for adjustable movement of the sleeve into and out of said connector, a rotary drive member in the sleeve and extending therefrom, a rotary seal between the drive member and the sleeve, an outside crank on the drive member, a rotary driven member in the sleeve and extending from its other end, an axially telescoping driving connection between said driving and driven members, spring reaction means between the driving and driven members biasing the driven member outward from the sleeve, and a cutting head supported by said driven member.

9. A drilling machine according to claim 8, wherein said crank comprises a removable member having a ratchet connection with the drive member, and including stop means limiting the outward movement of said driven member.

10. A drilling machine according to claim 8, wherein said cutting head comprises a central pilot drill and a surrounding hole saw, said drill including detent means adapted to hold captive on the drill any slug removed by the saw.

11. A cutting head for drilling comprising a helically fluted pilot drill having a cutting end and a back end, a surrounding circular hole saw, axial gashes on the sides of the drill and a transverse connecting gash across its back end, and a U-shaped spring clip interfitting with said gashes and having endwise detent-forming portions lying in its helical flutes whereby there will be held captive on the drill and within the circular saw any slug removed by the saw in cutting a hole.

12. A cutting head for drilling devices according to claim 11, wherein said hole saw has openings in its wall adapted for insertion of a tool to remove the slug from the drill.

13. A slug-retrieving drill head for drilling machines and the like having slug-forming hole saws, comprising a drill having helical flutes extending to its cutting end, said drill having axial gashes connected by a transverse gash across its other end, and a U-shaped spring clip interfitting with said gashes, the ends of said clip being formed as detents lying in regions of said flutes respectively for transverse movements into and out of said flutes.

14. A slug-retrieving drill head according to claim 13, wherein the spring clip is slidably attachable and detachable to and from the drill.

References Cited in the file of this patent
UNITED STATES PATENTS

| | | |
|---|---|---|
| 438,740 | Eley | Oct. 21, 1890 |
| 485,715 | Smith | Nov. 8, 1892 |
| 572,786 | Downey | Dec. 8, 1896 |
| 1,645,736 | Blanch et al. | Oct. 18, 1927 |